U S009191654B2

(12) United States Patent
Mase

(10) Patent No.: US 9,191,654 B2
(45) Date of Patent: Nov. 17, 2015

(54) THREE-DIMENSIONAL VIDEO DISPLAY DEVICE, CONTROL METHOD THEREOF, AND SCREEN ADJUSTING PROGRAM

(75) Inventor: Jitsuro Mase, Hiroshima (JP)

(73) Assignee: Rights Co., Ltd., Tokyo (JP)

( * ) Notice: Subject to any disclaimer, the term of this patent is extended or adjusted under 35 U.S.C. 154(b) by 428 days.

(21) Appl. No.: 13/817,233

(22) PCT Filed: Sep. 14, 2012

(86) PCT No.: PCT/JP2012/073679
§ 371 (c)(1),
(2), (4) Date: Feb. 15, 2013

(87) PCT Pub. No.: WO2013/150670
PCT Pub. Date: Oct. 10, 2013

(65) Prior Publication Data
US 2014/0210958 A1    Jul. 31, 2014

(30) Foreign Application Priority Data

Apr. 6, 2012 (JP) .................................. 2012-087500

(51) Int. Cl.
*H04N 13/04* (2006.01)
*G02B 27/02* (2006.01)
(Continued)

(52) U.S. Cl.
CPC ............ *H04N 13/042* (2013.01); *G02B 27/022* (2013.01); *G02B 27/2278* (2013.01);
(Continued)

(58) Field of Classification Search
CPC ..................................................... H04N 13/04
USPC ........................................ 348/51, 53, 42, 46
See application file for complete search history.

(56) References Cited

U.S. PATENT DOCUMENTS 5,086,354 A * 2/1992 Bass et al. ..................... 359/465
8,928,964 B1 * 1/2015 Sternowski ................... 359/238
(Continued)

FOREIGN PATENT DOCUMENTS

JP    2000-350237    12/2000
JP    2008-020564    1/2008
(Continued)

OTHER PUBLICATIONS

International Search Report, International Application No. PCT/JP2012/073679, Filed Sep. 14, 2012, Mailed Oct. 23, 2012, ISA/Japanese Patent Office.

*Primary Examiner* — Paulos M Natnael
(74) *Attorney, Agent, or Firm* — Brundidge & Stanger, P.C.

(57) ABSTRACT

An adjusting screen with a predetermined format including a specific indication mark which is used to correct the display irregularity of the screen in a relationship between a plurality of mirrors and regions of the screen with a predetermined format is generated to be displayed on a display screen. In accordance with a shift input instruction that moves the screen which is displayed on the display screen in a forward or backward direction as seen from a user, the screen shift control is performed to control the adjusting screen including a specific indication mark to be moved forward or backward by a predetermined amount to be displayed on the display screen. In a state where the screen is moved by a predetermined amount by the screen shift control (in a state where the screen deviation is corrected), a video is disposed in the plurality of regions to generate an adjusting screen with a format to be displayed on the display screen and the displayed video is reflected from the plurality of mirrors to be displayed as a three-dimensional video.

13 Claims, 14 Drawing Sheets

(51) Int. Cl.
  *G02B 27/22* (2006.01)
  *G03B 15/12* (2006.01)
  G03B 25/00 (2006.01)
  G03B 35/18 (2006.01)

(52) U.S. Cl.
  CPC ............ *G03B15/12* (2013.01); *H04N 13/0495* (2013.01); *H04N 13/0497* (2013.01); *G03B 25/00* (2013.01); *G03B 35/18* (2013.01)

(56) References Cited

U.S. PATENT DOCUMENTS 8,988,343 B2 * 3/2015 Fei et al. ....................... 345/156

| | | | |
|---|---|---|---|
| 2003/0048354 A1* | 3/2003 | Takemoto et al. | 348/51 |
| 2004/0223379 A1* | 11/2004 | Tomisawa | 365/200 |
| 2007/0187616 A1* | 8/2007 | Burroughs et al. | 250/458.1 |
| 2007/0285585 A1* | 12/2007 | Nakamura et al. | 348/744 |
| 2011/0032365 A1* | 2/2011 | Yett | 348/207.1 |
| 2011/0298820 A1* | 12/2011 | Hajjar | 345/619 |
| 2011/0304710 A1* | 12/2011 | Ito et al. | 348/51 |
| 2012/0110501 A1* | 5/2012 | Baek et al. | 715/800 |
| 2013/0102390 A1* | 4/2013 | Klein et al. | 463/37 |

FOREIGN PATENT DOCUMENTS

| | | |
|---|---|---|
| JP | 2009-053539 | 3/2009 |
| WO | 2008-149423 | 12/2008 |

* cited by examiner

THREE-DIMENSIONAL VIDEO DISPLAY DEVICE, CONTROL METHOD THEREOF, AND SCREEN ADJUSTING PROGRAM

TECHNICAL FIELD

The present invention relates to a three-dimensional video display device, a control method thereof, and a screen adjusting program, and specifically, to a screen adjustment of a video display irregularity in a three-dimensional video display device that displays a video to be displayed in a video display device as a three-dimensional video using mirrors.

BACKGROUND ART

A three-dimensional video display device that displays a video displayed in a two-dimensional video display device as a three-dimensional video using a mirror assembly including a plurality of half mirrors has been known. For example, a three-dimensional video display device which is suggested in this invention is disclosed in Patent Document 1. In other words, using a mirror device having a plurality of mirrors (half mirrors and total reflection mirror) which are inclined on a screen of the two-dimensional video display device toward an observer at a predetermined angle and disposed at a predetermined interval in a depth direction, in a screen of the two-dimensional video display device, a plurality of virtual image generating regions that generate virtual images by the mirrors in a position of the mirror and virtual image non-generating regions that do not generate a virtual image between the virtual image generating regions are formed, and an image displayed in the virtual image generating region is reflected by a corresponding mirror to be displayed as a three-dimensional video at an observer side.

Further, a similar three-dimensional video display device is also disclosed in Patent Document 2. Most of all, in Patent Document 2, it is disclosed that when information is displayed in each display region of the display screen which is divided into (N+1) regions, an enlargement/reduction controller 105 controls the enlargement or reduction of a display size at which the information is displayed (size of the display region).

PRIOR ART DOCUMENT

Patent Document

[Patent Document 1] Japanese Patent Application Laid-Open No. 2008-20564
[Patent Document 2] Japanese Patent Application Laid-Open No. 2009-53539

SUMMARY OF THE INVENTION

Problems to be Solved by the Invention

In the three-dimensional video display device, if a virtual image generating region of a screen of a two-dimensional video display device does not appropriately correspond to a position of a mirror, a desired three-dimensional video may not be displayed. In other words, if the virtual image generating region does not exactly correspond to the position of the mirror, the video may be deviated to an upper or lower side from a predetermined position or a video of virtual image generating regions other than the desired virtual image generating region may be displayed.

The image displayed in the three-dimensional video display device, as illustrated in FIG. 4, is created so as to be fit with a screen having a three-dimensional video format 90. In the three-dimensional video format 90, a plurality of virtual image generating regions 91 and a plurality of virtual image non-generating regions 92 are alternately formed and videos 94a to 94c are generated in the virtual image generating region 91. The videos 94a to 94c generated in the virtual image generating region 91 having the three-dimensional video format 90 are reflected from a plurality of mirrors so as to be displayed as a predetermined three-dimensional video.

However, due to various reasons, sometimes, the positional relationship between the mirrors and the screen of the two-dimensional video display device is not appropriate. For example, if a mirror device is mounted in a smart phone as a two-dimensional display device while mounting a case called as a jacket, the positional relationship may be deviated as much as the thickness of the jacket. In this case, the virtual image generating region 91 in which the video is displayed may be shifted forward or backward from a normal position, so that the three-dimensional video may be displayed to be deviated from a normal position.

Further, sizes of screens of smart phones are varied depending on the models of the smart phones. Therefore, even though the image is created according to the three-dimensional video format 90, the position of the mirrors of the mirror device and the virtual image generating region may not be matched. In this case, the image needs to be enlarged or reduced to be displayed so that the intervals Eb and Ec between the virtual image generating regions are matched with the intervals Db and Dc between the mirrors.

Since there are various types of jackets or two-dimensional video display devices, it is actually difficult to automatically adjust the screen including the virtual image generating regions so as to correspond to the various types of jackets or two-dimensional video display devices. For example, a method is considered that automatically reads out the size information at the time of displaying the three-dimensional video, to adjust the screen according to size information of a screen while storing the size information of the screen in a memory of the two-dimensional video display device. However, information on whether a jacket is mounted on the two-dimensional video display device or a thickness of the jacket is state information separate from the two-dimensional video display device, and it is difficult to store information including the state information in the two-dimensional video display device as the size information. Accordingly, the screen may be adjusted by the manipulation of an observer at the time of displaying the three-dimensional video while the observer watches the three-dimensional video.

In Patent Document 2, it is disclosed that an enlargement/reduction controller 105 controls the enlargement and reduction of a display size at which the information is displayed. However, it is not suggested how the display irregularity in the depth direction of the screen is adjusted. Further, it is not suggested that the screen deviation is adjusted by the manipulation of the observer while the observer is watching the screen.

The present invention is directed to provide a three-dimensional display device that is capable of adjusting a display irregularity of a screen of a video display device that displays a three-dimensional video by the manipulation of an observer, a control method thereof, and a screen adjusting program.

More specifically, the present invention is directed to provide a three-dimensional display device that is capable of adjusting a screen by moving in a depth direction or enlarging or reducing a screen to be displayed in the video display device by the manipulation of an observer and displaying a video displayed in the adjusted screen as a three-dimensional video through a mirror, a control method thereof, and a screen adjusting program.

Means for Solving the Problems

A three-dimensional video display device according to the present invention preferably includes a mirror device in which a plurality of mirrors are disposed to be parallel to each other and reflects a video displayed on a display screen of the video display device from the plurality of mirrors to display the video as a three-dimensional video. The video display device includes a storage unit that stores a program and a video; a processor that executes the program; a display unit having a display screen that displays a screen with a predetermined format having a plurality of regions corresponding to the plurality of mirrors in order to display the three-dimensional video; and an input unit that is manipulated by a user. The input unit includes a shift input unit that instructs to move the screen with the format to be displayed on the display screen in a forward or backward direction of the display screen as seen from the user. The processor executes the program to function as: a unit that generates an adjusting screen with a predetermined format including display of a specific indication mark which is used to check display irregularity of the screen in a relationship between the mirror and the region of the screen with the format; a screen shift control unit that controls the adjusting screen including the indication mark to be moved forward or backward by a predetermined amount to be displayed on the display screen in accordance with an instruction from the shift input unit; and a unit that disposes a video for displaying the three-dimensional video in the plurality of regions so as to generate a screen with the format in a state where the screen is moved by a predetermined amount by the control of the screen shift control unit. The video of the screen with the format generated by the generating unit is displayed on the display screen of the video display device and the displayed video is reflected from the plurality of mirrors to be displayed as a three-dimensional video.

In a preferred example, the input unit includes an enlargement/reduction input unit that instructs the screen with the format which is displayed on the display screen to be enlarged or reduced. The processor executes the program to function as: a unit that generates an adjusting screen with the format including display of a specific indication mark which is used for correction to enlarge or reduce the screen in a relationship between the mirror and the region of the screen with the format; a screen enlargement/reduction control unit that controls the adjusting screen including the indication mark to be enlarged or reduced by a predetermined amount to be displayed on the display screen in accordance with an instruction from the enlargement/reduction input unit; and a unit that disposes a video for displaying the three-dimensional video in the plurality of regions so as to generate a screen having the format in a state where the screen is enlarged or reduced by a predetermined amount by the control of the screen enlargement/reduction control unit. The video of the screen with the format generated by the generating unit is displayed on the display screen of the video display device and the displayed video is reflected from the plurality of mirrors to be displayed as a three-dimensional video.

Also preferably, the input unit is a touch type input unit, and the processor generates a screen in which an input button that configures the shift input unit or the enlargement/reduction input unit may be disposed in the adjusting screen.

Also preferably, the input unit may be a touch type input unit and the processor may generate a screen in which a mode selecting button that selects a shift mode by the screen shift control unit and an enlargement/reduction mode by the screen enlargement/reduction control unit is disposed in the adjusting screen.

Also preferably, a border of the plurality of regions that configure the format screen is set based on positions of the plurality of mirrors corresponding to the display screen and the indication mark is formed to be line symmetric or asymmetric to a line that defines the border.

Also preferably, the processor generates the adjusting screen in which the shift input button, the enlargement/reduction input button, and the mode selecting button are disposed in a region which is the closest to the user among the plurality of regions that configures the format screen.

A control method of a three-dimensional video display according to the present invention preferably disposes a mirror device in which a plurality of mirrors are disposed to be parallel to each other in a video display device which includes a display unit having a display screen that displays a screen with a predetermined format having a plurality of regions corresponding to the plurality of mirrors in order to display a three-dimensional video and an input unit that is manipulated by a user, and reflects a video displayed on a display screen of the video display device from the plurality of mirrors to display the video as a three-dimensional video. The method includes: a step of generating an adjusting screen with the format including display of a specific indication mark which is used to check display irregularity of the screen in a relationship between the mirror and the region of the screen with the format; a shift input step of instructing the screen with the format which is displayed on the display screen to be moved in a forward or backward direction of the display screen as seen from the user by the manipulation of the input unit; a screen shift control step of controlling the adjusting screen including the indication mark to be moved forward or backward by a predetermined amount to be displayed on the display screen in accordance with an instruction from the shift input step; a step of generating a screen with the format in a state where the screen is moved by a predetermined amount by the screen shift control step by disposing a video for displaying the three-dimensional video in the plurality of regions; and a step of displaying the video of the screen with the format generated by the generating step on the display screen of the video display device and reflecting the displayed video from the plurality of mirrors to be displayed as a three-dimensional video.

A screen adjusting program is executed by a processor in a three-dimensional video display device according to the present invention that preferably disposes a mirror device in which a plurality of mirrors are disposed to be parallel to each other in a video display device which includes a storage unit that stores a program and a video, a processor that executes the program, a display unit having a display screen that displays a screen with a predetermined format having a plurality of regions corresponding to the plurality of mirrors in order to display a three-dimensional video and an input unit that is manipulated by a user, and reflects a video displayed on a display screen of the video display device from the plurality of mirrors to display the video as a three-dimensional video. The program executes operations including: a step of generating an adjusting screen with the format including display of a specific indication mark which is used to check display irregularity of the screen in a relationship between the mirror and the region of the screen with the format; a shift input step of instructing the screen with the format which is displayed on the display screen to be moved in a forward or backward direction of the display screen as seen from the user by the manipulation of the input unit; a screen shift control step of controlling the adjusting screen including the indication mark to be moved forward or backward by a predetermined amount to be displayed on the display screen in accordance with an instruction from the shift input step; and a step of generating a screen with the format in a state where the screen is moved by a predetermined amount by the screen shift control step by disposing a video for displaying the three-dimensional video in the plurality of regions.

Effect of the Invention

According to the present invention, it is possible to adjust a display irregularity of a screen of a video display device that displays a video. In other words, it is possible to adjust a screen by moving a screen of the video display device in a depth direction or enlarging or reducing the screen and to display the image displayed using the adjusted screen as a three-dimensional video through a mirror device. By doing this, a mirror device is disposed in the video display device having screens with different lengths in a depth direction at least as seen from the observer side to display a three-dimensional video, which may expand a range of a video display device which may be applied to the three-dimensional display device.

MODE FOR CARRYING OUT THE INVENTION

Hereinafter, embodiments of the invention will be described in detail with reference to the drawings.

Figure 1:
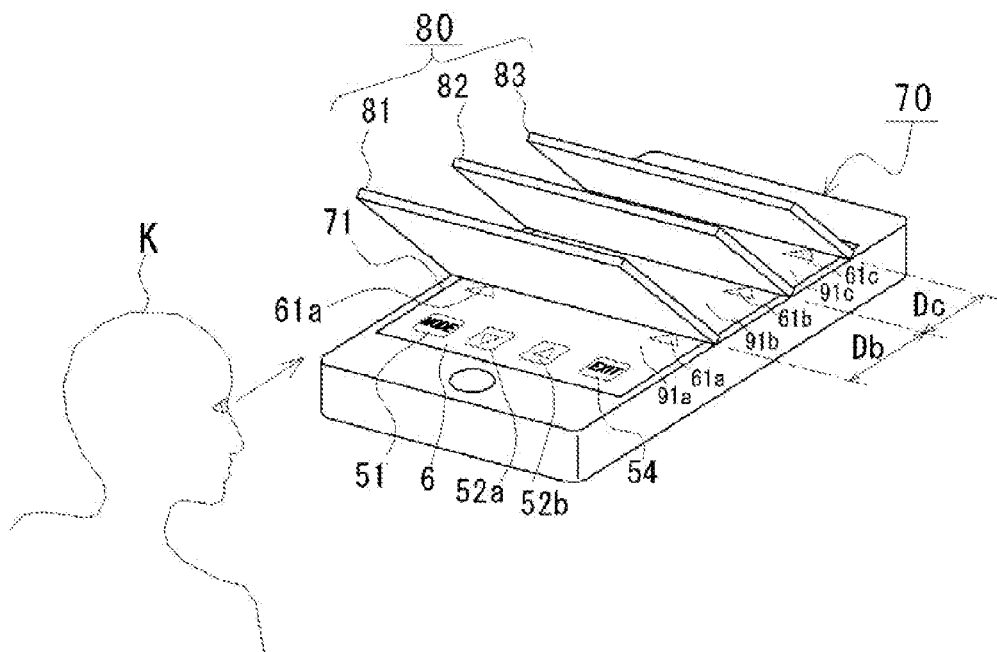
FIG. 1 A perspective view illustrating a three-dimensional video display device according to an embodiment.

FIG. 1 illustrates an example of a three-dimensional video display device according to an embodiment.

The three-dimensional video display device is configured by a two-dimensional video display device 70 and a mirror device 80. The two-dimensional video display device 70 is a video display device such as a smart phone or a tablet terminal. The mirror device 80 includes a plurality of mirrors (half mirrors 81 and 82 and a total reflection mirror 83) which are inclined with respect to a screen 71 (refers to a physical screen) at a predetermined angle toward an observer K and disposed to be parallel to each other with a predetermined interval in a depth direction. The observer uses the mirror device 80 so as to be mounted in the two-dimensional video display device 70. In the screen 71 of the two-dimensional video display device 70, a plurality of virtual image generating regions and virtual image non-generating regions that do not generate a virtual image between the virtual image generating regions are formed, and videos displayed in the virtual image generating regions 91a to 91c are reflected by corresponding mirrors 81 to 83 to be displayed as a three-dimensional video at the observer side.

Figure 14:
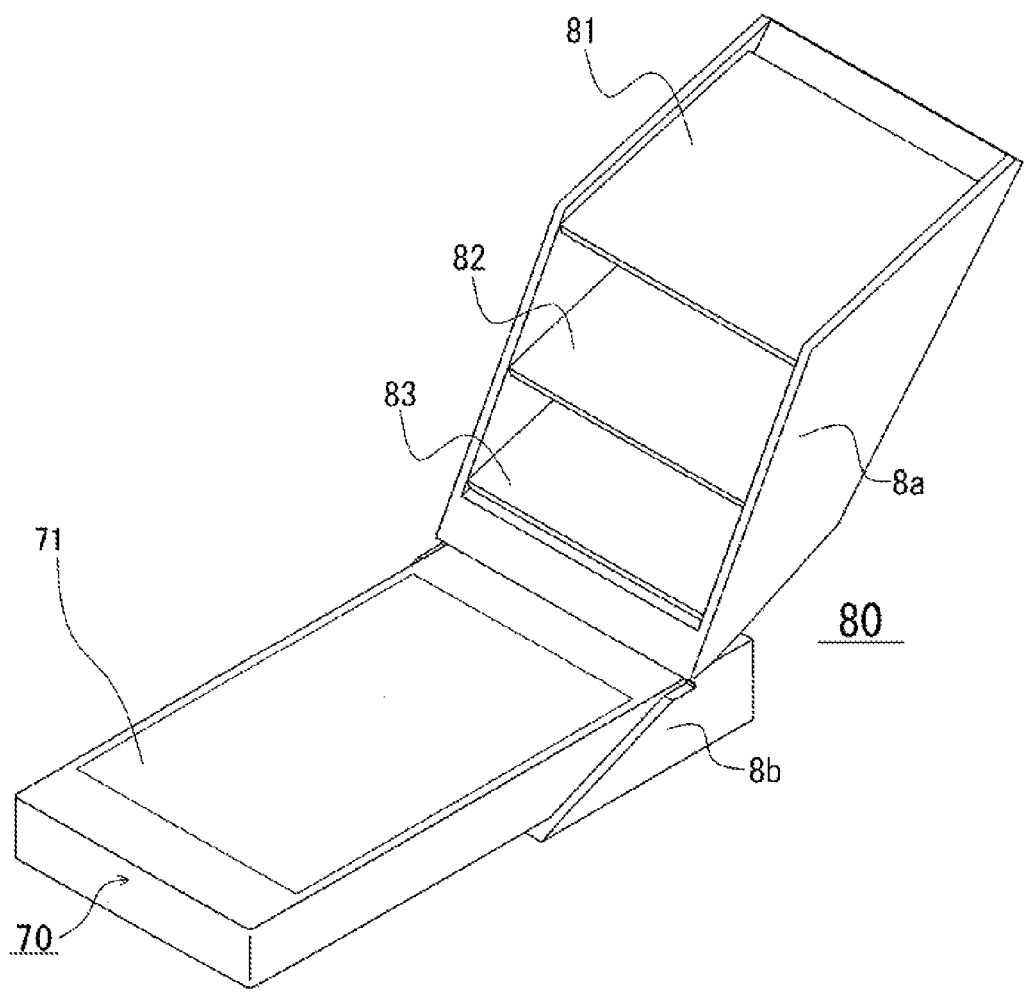
FIG. 14 A perspective view of a three-dimensional video display device according to an embodiment.
Figure 15:
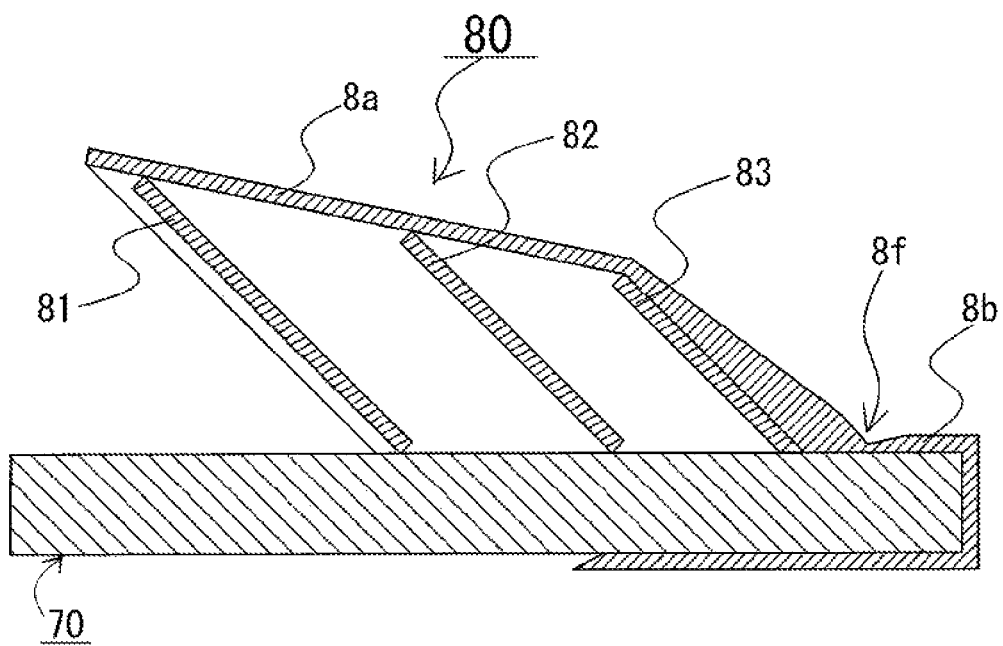
FIG. 15 A cross-sectional view of a three-dimensional video display device according to an embodiment.

FIG. 1 schematically illustrates the three-dimensional video display device and FIGS. 14 and 15 illustrate a configuration of the mirror device 80 and an example in which the mirror device 80 and the two-dimensional video display device 70 are mounted. Referring to these drawings, the mirror device 80 is mainly configured by a mirror case 8a in which rectangular half mirrors 81 and 82 and total reflection mirror 83 (hereinafter, simply referred to as mirror) are mounted in parallel to each other and a main body case 8b in which the two-dimensional video display device 70 is mounted. The mirror case 8a and the main body case 8b are connected by a hinge 8f. Therefore, the mirror case 8a, the main body case 8b, and the hinge 8f may be integrally formed of a synthetic resin having a high hinge resistance such as polypropylene. In the mirror case 8a, three pairs of grooves are formed to be parallel to each other and the rectangular mirrors 81 to 83 are fixed to the grooves. In this example, the main body case 8b is formed so as to support the two-dimensional video display device 70 by covering an edge of the two-dimensional video display device and has a size and a shape that allow a two-dimensional video display device 70 having a jacket mounted therein or a two-dimensional video display device having slightly different horizontal and vertical widths or depth to be inserted and mounted therein.

As illustrated in FIG. 14, in a state where the mirror case 8a is open, the two-dimensional video display device 70 is inserted from the front side (observer side) into the main body case 8a and an edge thereof is pressed against a deepest part of the main body case 8a In this state, if the mirror case 8a is closed, the state is as illustrated in FIG. 15 and the observer may watch a virtual image obtained by reflecting a video formed on the screen 71 of the two-dimensional video display device 70 from the mirrors 81 to 83.

Next, an adjustment function of a display irregularity of a screen will be described.

In the embodiment, in order to adjust the display irregularity of the screen, a screen shifting function and a screen enlarging or reducing function of the screen are set. In order to check whether there is a display irregularity of the screen, and in order to achieve the shifting function and the enlarging or reducing function, a display irregularity adjusting screen (hereinafter, simply referred to as adjusting screen) 6 is defined. The adjusting screen 6 is a screen defined as a predetermined format.

Even though the adjusting screen 6 will be described below with reference to FIGS. 6, 11, and 13, if it is briefly described, the adjusting screen is stored in a storage unit 204 or a memory 203 and displayed on a screen 71 of the two-dimensional video display device as a three-dimensional video format 90 in accordance with the execution of the screen adjusting program. In the adjusting screen 6, reference marks 61a, 61b, and 61c (see FIG. 6) as an indication for checking the presence or absence of display irregularity of a screen, a mode button 51 for setting the shifting function (mode) or enlarging or reducing function (mode), a shift button 52 (see FIG. 11) for controlling the screen to be shifted (moved) in a front (observer side) or back direction (direction which is far from the observer) by a predetermined amount, an enlargement/reduction button 53 (see FIG. 13) for controlling a size of the screen to be enlarged or reduced, and an end button 54 are set. In the shift button 52, a front shift button 52a that shifts the screen in a front direction by a predetermined amount and a back shift button 52b that shifts the screen in a back direction by a predetermined amount, which is contrary to the front shift button 52a, are included. In the enlargement/reduction button 53, a reduction button 53a and an enlargement button 53b are included.

In the case of a smart phone or a tablet terminal, since an input unit 206 is set as a plurality of touch (contact) type display buttons (also referred to as display keys) in the screen 71, the mode button 51, the shift button 52, the enlargement/reduction button 53, and the end button 54 are also set in the adjusting screen 6 as touch type input keys. Further, the mode button 51, the shift button 52, the enlargement/reduction button 53, and the end button 54 are disposed in the virtual image generating region 91a which is closest to the observer in the adjusting screen 6. Accordingly, the observer may manipulate these buttons using fingers from the inside of the mirror case 8a in a state where the mirror device 80 is mounted in the two-dimensional video display device 70.

The mode button 51 switches the shift mode and the enlargement/reduction mode whenever the mode button 51 is pressed. In the case of the shift mode, as illustrated in FIG. 11(a), the adjusting screen 6 including the shift button 52 is displayed and in the case of the enlargement/reduction mode, as illustrated in FIG. 13(a), the adjusting screen 6 including the enlargement/reduction button 53 is displayed. If the end button 54 is pressed, the control operation of the screen adjustment is completed.

Figure 5:
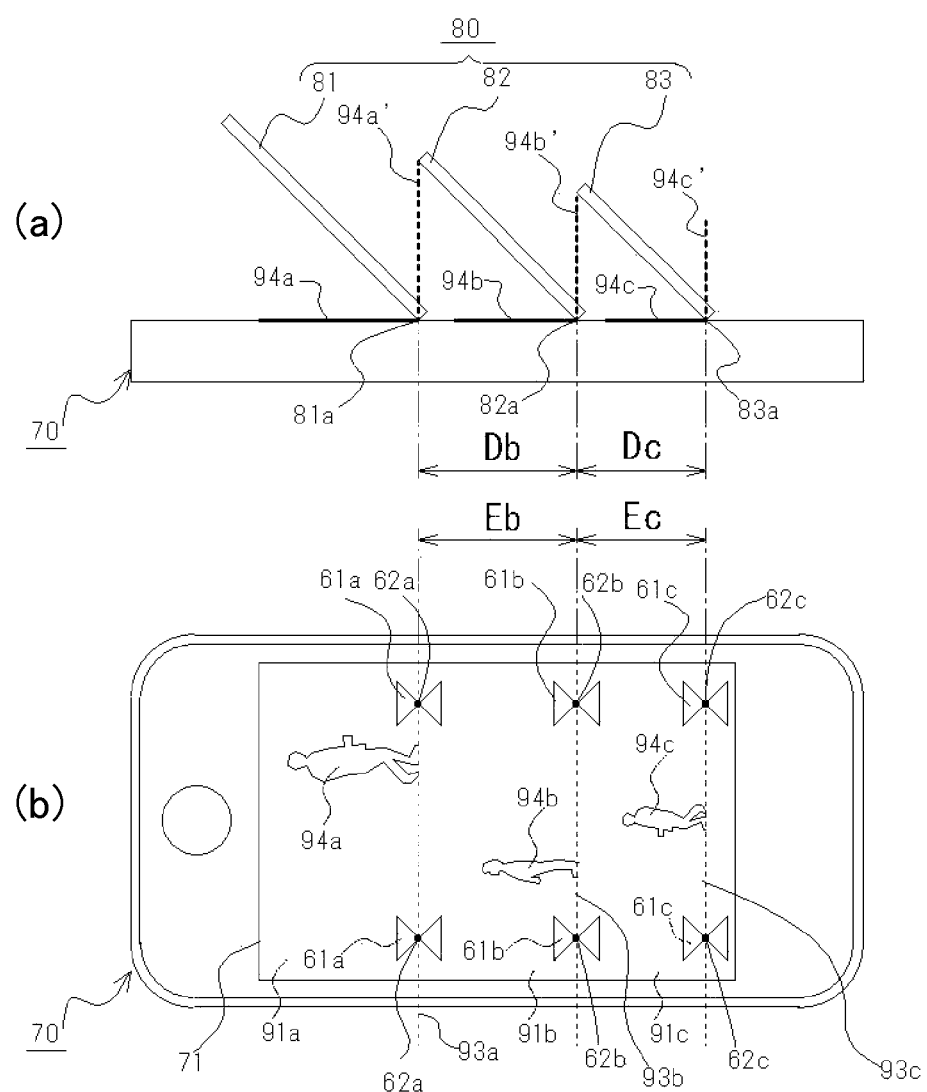
FIG. 5 A side view of a three-dimensional video display device according to an embodiment and a plan view of a video displayed in a three-dimensional video format of a two-dimensional video display device.

In FIG. 5, (a) is a side view of a three-dimensional video display device, that is, the mirror device 80 and the two-dimensional video display device 70 and (b) is a plan view illustrating a video 94 which is displayed in the two-dimensional video display device 70 as a three-dimensional video format 90 and the adjusting screen 6.

In an example illustrated in FIG. 5, intervals of boundary lines 93 of the three-dimensional video formats 90 are denoted by Eb and Ec and intervals of lower edges 81a, 82a, and 83a of the mirrors 81, 82, and 83 are denoted by Db and Dc. Further, Eb=Db and Ec=Dc. In addition, it is important that the boundary lines 93a, 93b, and 93c are present at the same positions as the lower edges 81a, 82a, and 83a of the mirror. In this state, virtual images 94a', 94b', and 94c' of the videos 94a, 94b, and 94c which are displayed in the screen 71 of the two-dimensional video display device 70 are generated in predetermined positions and a predetermined three-dimensional video is displayed. Here, the boundary lines refer to lines that divide the screen of the two-dimensional video in order to illuminate the two-dimensional video to be displayed on the screen on the plurality of mirrors. The boundary lines 93 indicate positions of straight lines present in the three-dimensional video format 90.

The screen adjustment may be performed by combining the shifting function and the enlarging or reducing function. Therefore, if the enlargement or reduction operation is performed on the adjusting screen 6, the adjusting screen 6 is enlarged or reduced based on the reference point 63b (see FIG. 13). The reference point 63b is located on the boundary line 93b of the adjusting screen 6. Due to the position of the reference point 63b, the boundary line 93b is always maintained at a fixed position without moving forward or backward regardless of the enlargement or reduction operation.

Figure 8:
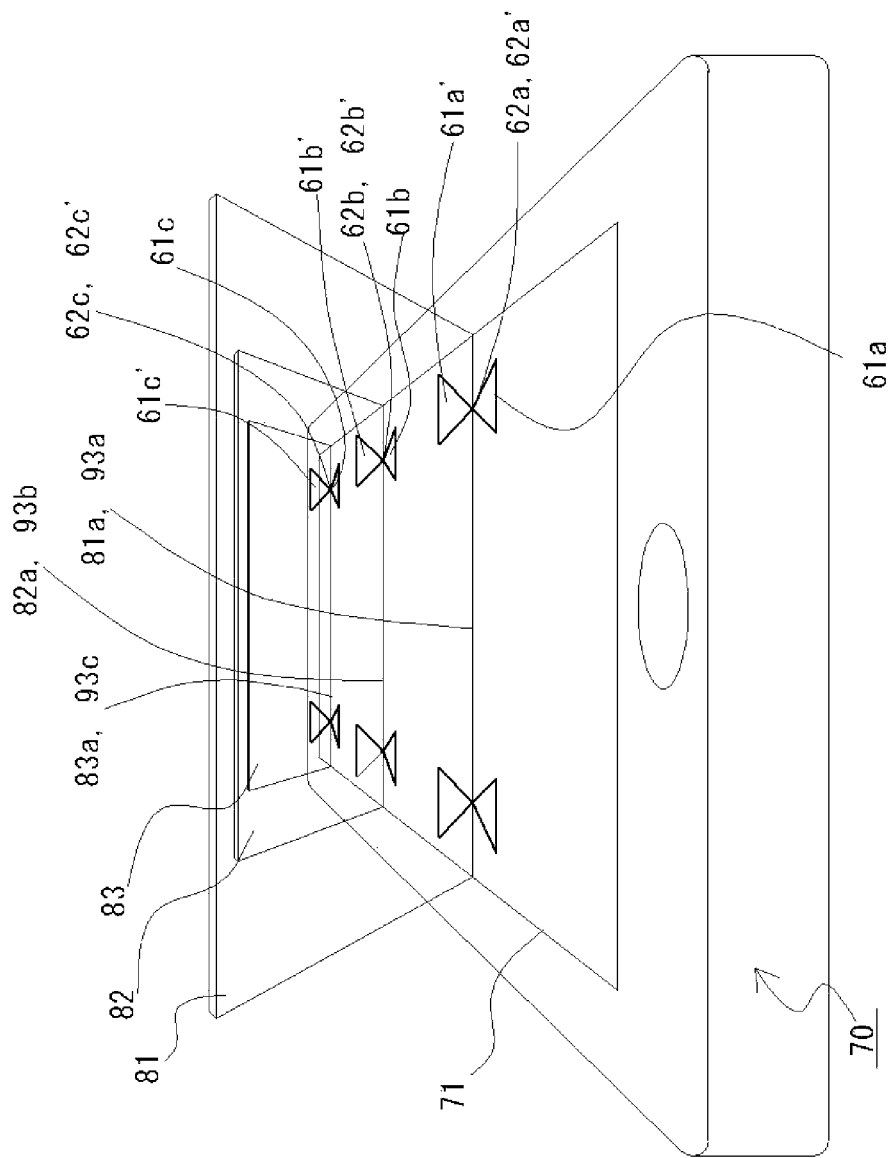
FIG. 8 A perspective view of a three-dimensional video of an adjusting screen which does not need to adjust a screen according to an embodiment.
Figure 12:
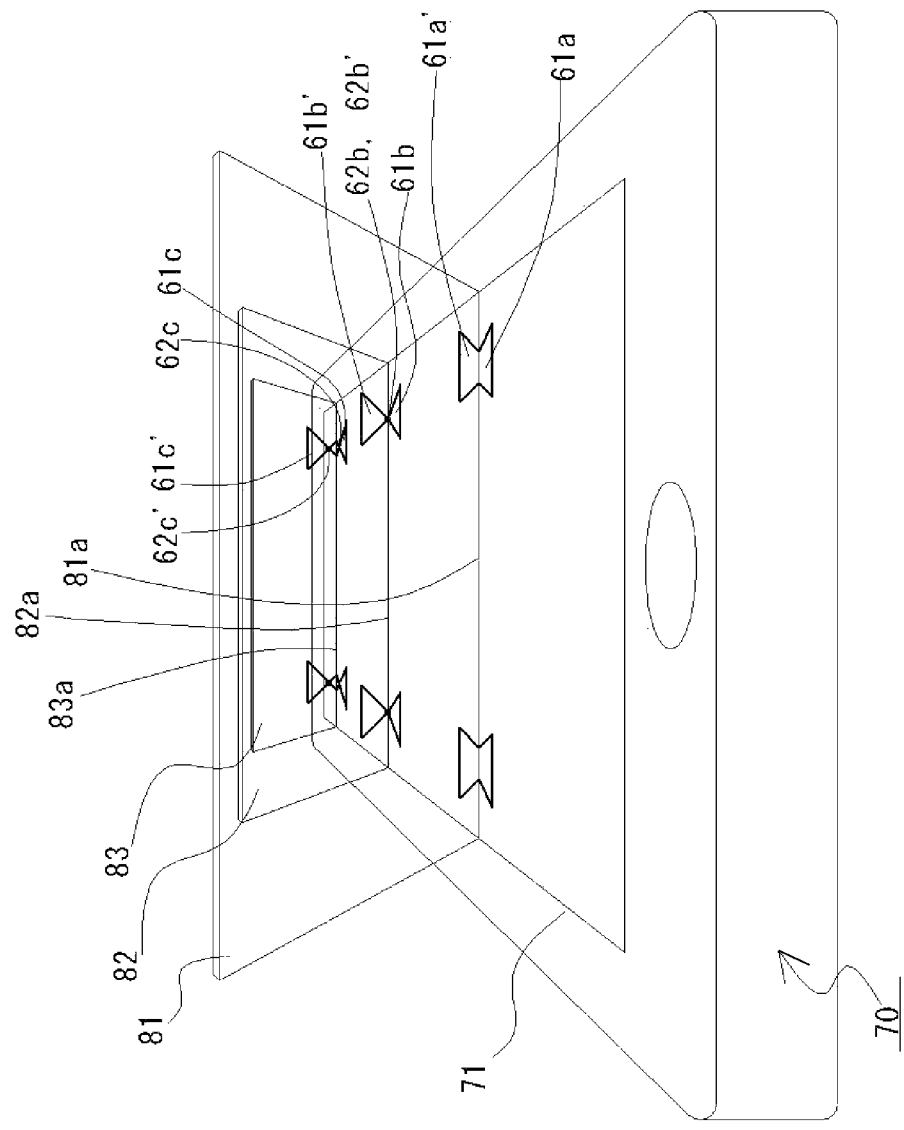
FIG. 12 A perspective view of a three-dimensional video which needs to enlarge or reduce a screen according to an embodiment.

By the screen adjustment operation by the observer, the boundary line 93b is first matched with a lower edge 82a of the mirror 82 by the shift adjustment. FIG. 12 is a video which is watched by the observer. In this stage, the observer manipulates the shift button so that the virtual image 62b' of the reference point of the reference mark 61b is located above the lower edge 82a of the mirror. However, the positions of virtual images 62a' and 62c' of the other reference marks 61a and 61c are ignored. Next, the observer manipulates the mode button 51 to switch the mode to the enlargement/reduction mode. Then, as illustrated in FIG. 8, the enlargement/reduction button is manipulated until the virtual images 62a' and 62c' of the other reference marks 61a and 61c are located at the lower edges 81a and 83a of the mirrors. Since the boundary line 93b and the lower edge 82a of the mirror are fixed, the state of FIG. 8 may be achieved by a smaller number of operations of the enlargement/reduction button.

As described above, by sequentially performing of matching the boundary line 93b with the lower edge 82a of the mirror by the shift adjustment, performing then the enlargement or reduction operation in a state where the boundary line 93b is fixed, and matching the other boundary lines 93a and 93c with the lower edges 81a and 83a of the mirrors in this order, appropriate shift adjustment and enlargement adjustment may be certainly achieved by a simple operation.

Further, reference points may be set in positions other than 63b. For example, a reference point may be located in a position of 63a located on the boundary line 93a. In this case, the operation is performed by first matching the boundary line 93a with a lower edge 81a of the mirror by the shift adjustment and the subsequent operations are the same as the above.

Figure 6:
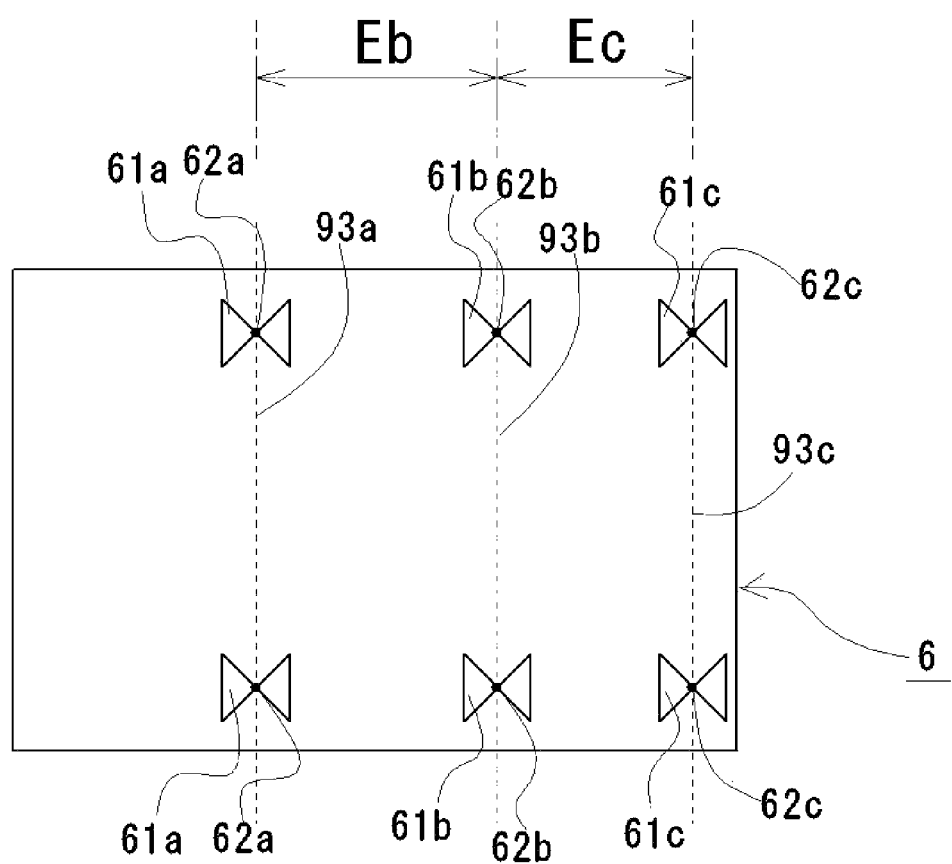
FIG. 6 A view illustrating an example of a display irregularity adjusting screen according to an embodiment.

Referring to FIG. 6, an example of the display irregularity adjusting screen and the reference mark 61 in the display irregularity adjusting screen will be described.

The adjusting screen 6 may be one sheet of still image having a resolution which is substantially equal to a physical resolution of the screen 71 of the two-dimensional video display device 70. The adjusting screen is usually stored in the storage unit 204 or the memory 203 and is displayed on the screen 71 of the two-dimensional video display device as a three-dimensional video format 90 in accordance with the execution of the screen adjusting program by the processor 202, which will be described below.

On the adjusting screen 6, reference marks 61a, 61b, and 61c formed by a pair of triangles whose apexes are disposed to be in contact with a line on the boundary line 93 of a three-dimensional video format 90 are drawn. The reference marks are in contact with each other at one apex 62. Since the reference mark 61 is drawn near the boundary, if the number of boundary lines 93 is three, a total of six reference marks 61 are drawn at their positions.

Figure 7:
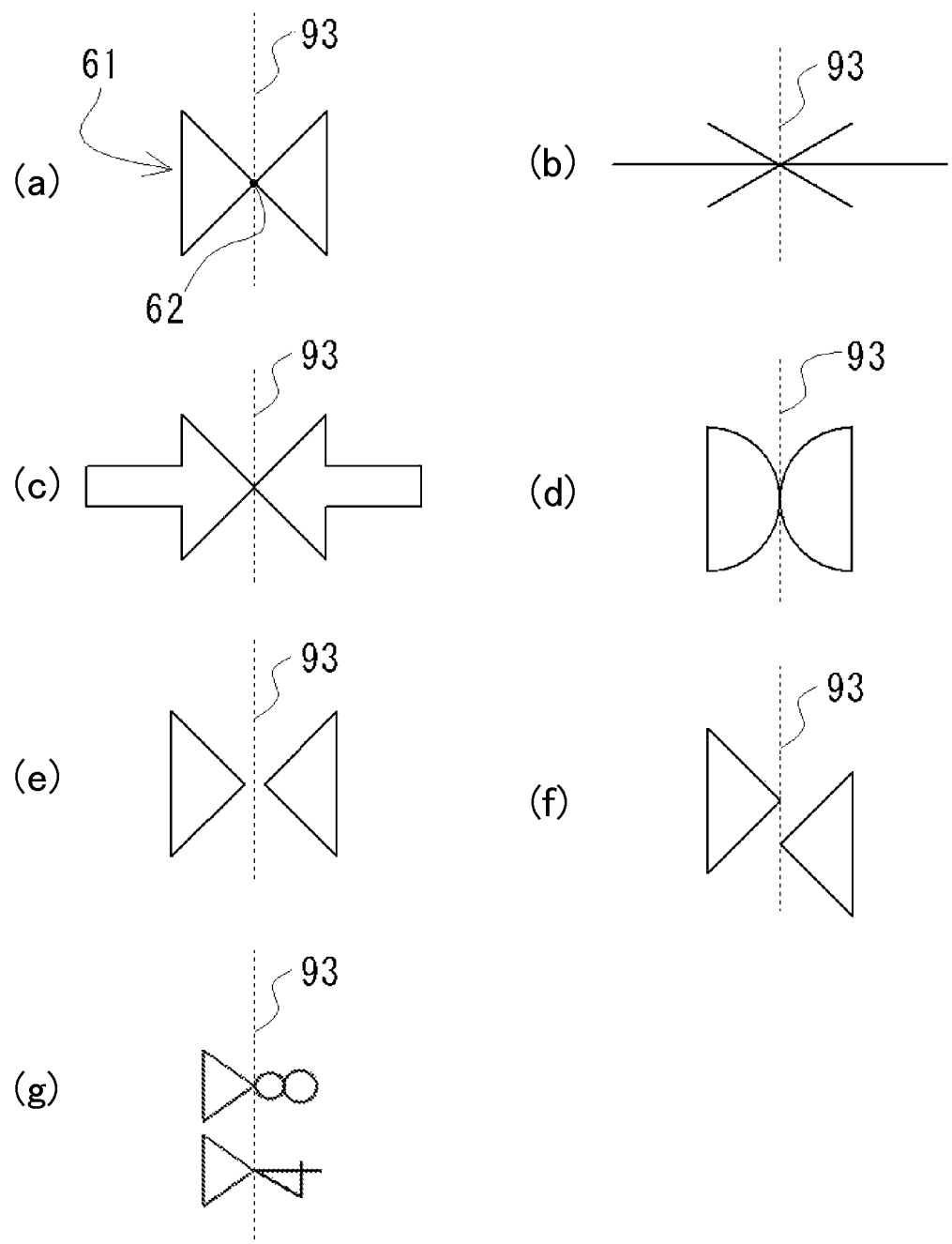
FIG. 7 A view illustrating an example of a reference mark of a display irregularity adjusting screen according to an embodiment.

The reference marks 61 may be one pair of triangles as illustrated in FIG. 7(a). However, according to an alternative example, the invention is not limited thereto, but, for example, the reference marks may be opposite arrows as illustrated in (b) or (c). Alternatively, the reference marks may be opposite circular arcs as illustrated in (d). In summary, the reference marks may be a pair of diagrams having apexes which are in contact with each other on the boundary line 93, that is, line symmetrical with each other on both sides of the boundary line 93. Further, as illustrated in (e), the apexes are not in contact with each other on the boundary line 93 but slightly separated from each other.

Further, the reference marks may not be the line symmetrical diagrams with respect to the boundary line 93 as described in the example, but may be diagrams which are horizontally slightly deviated from each other as illustrated in (f).

The reference marks may be a combination of one or plural simple characters (for example, "48") and a diagram (triangle) as illustrated in (g) rather than a diagram or a symbol. In this case, the character and the apex of the triangle are in contact with each other on the boundary line 93 as a border. If the screen indication is deviated in any direction, the character is discontinued or the triangle appears at the viewpoint of the observer so that the observer notices that the shift adjustment of the screen is necessary.

In summary, the reference marks may be used if the reference marks are indication marks such as a diagram, a symbol, or a character which may allow the deviation of the videos to be easily noticed by comparing the videos displayed on the screen 71 and the videos reflected from the mirrors 81 to 83.

[Case where Screen is not Deviated]

FIG. 8 is a perspective view of a three-dimensional image of the adjusting screen which does not need to adjust the screen.

FIG. 8 is a perspective which is seen from a viewpoint of the observer when the adjusting screen 6 is displayed on the three-dimensional video display device. The lower edges 81a, 82a, and 83a of the mirrors are matched with the boundary lines 93a, 93b, and 93c of the adjusting screen 6 in FIG. 5 or 6. In this case, the intervals Eb and Ec between the boundary lines 93a, 93b, and 93c and the intervals Db and Dc between the lower edges 81a, 82a, and 83a of the mirrors are the same. Further, FIG. 11(a) illustrates the positional relationship of the screen 71 of the two-dimensional video display device 70 and the adjusting screen 6 in this state. In this case, as illustrated in FIG. 8, the virtual images 62a', 62b', and 62c' of the apex 62 of the triangular reference mark 61 are illustrated so as to be in contact with the lower edges 81a, 82a, and 83a of the mirrors.

[Case where Screen is Deviated]

Figure 9:
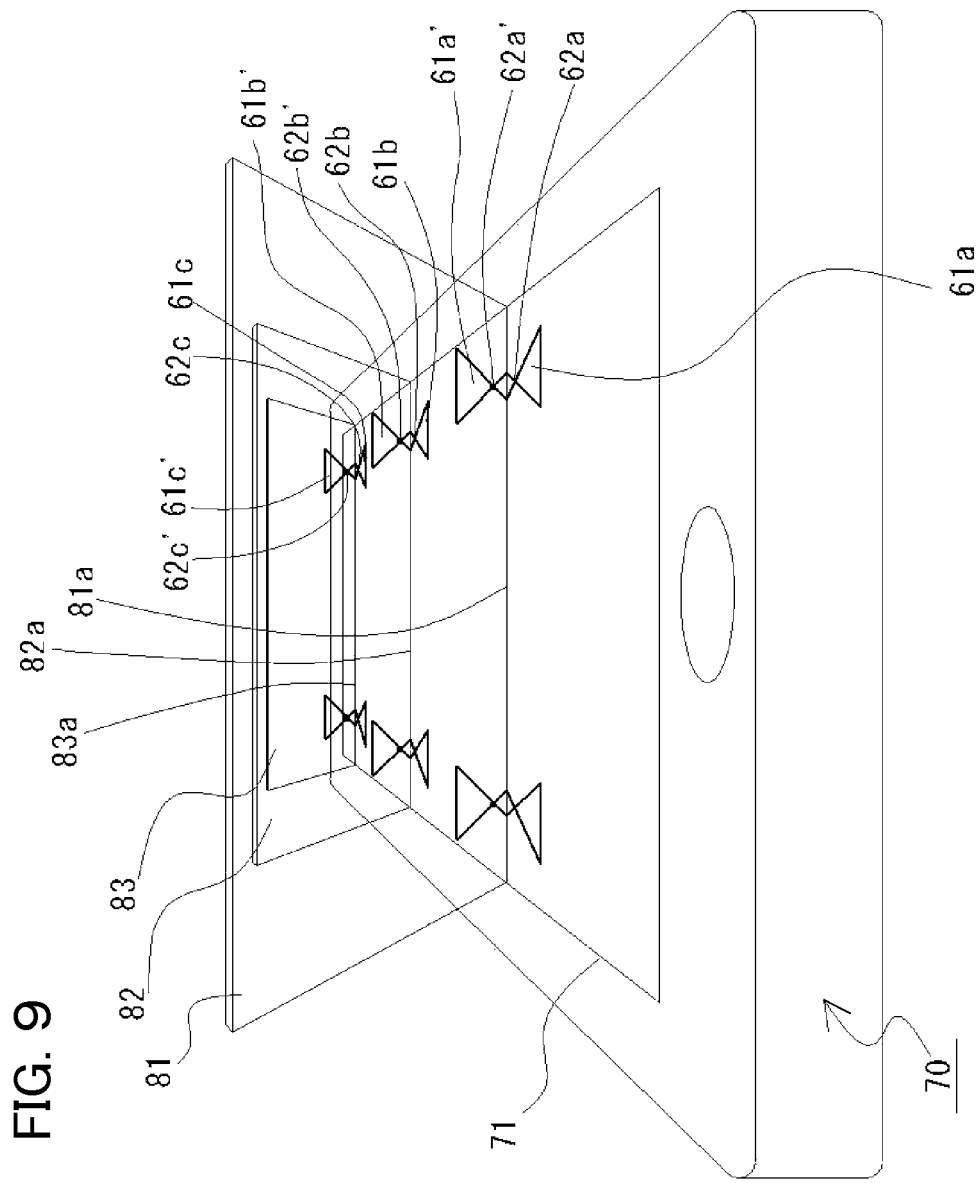
FIG. 9 A perspective view of a three-dimensional video which needs to shift the screen according to an embodiment.

As illustrated in FIG. 11(b), in a state where the two-dimensional video display device 70 is deviated at the front from the mirror device 80 (front side as seen from the observer) so that the lower edges 81a, 82a, and 83a of the mirrors are not matched with the boundary lines 93a, 93b, and 93c, as illustrated in FIG. 9, the virtual images 62a', 62b', and 62c' of the apexes of the reference marks are displayed so as to be spaced apart from the lower edges 81a, 82a, and 83a of the mirrors.

Figure 10:
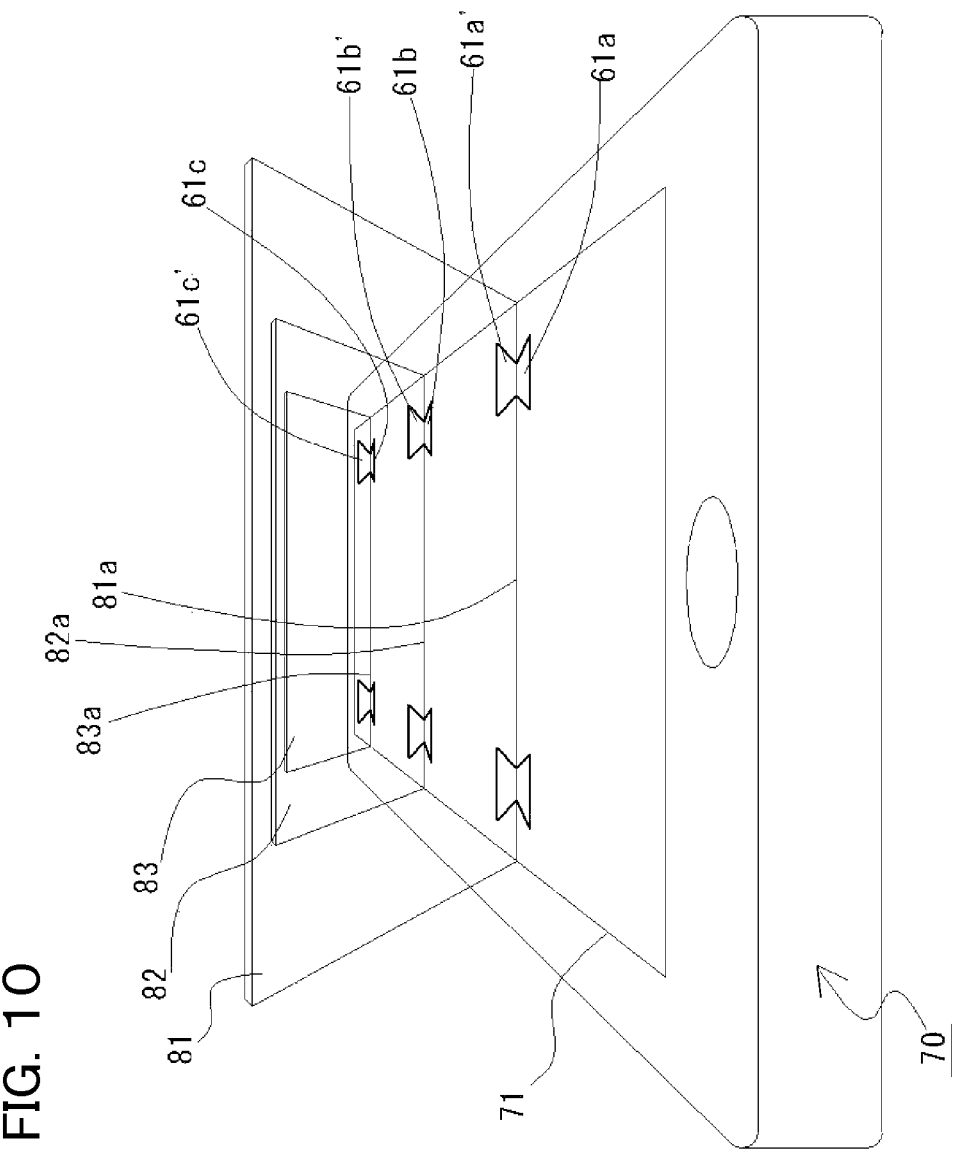
FIG. 10 A perspective view of a three-dimensional video which needs to shift the screen according to an embodiment.

Further, as illustrated in FIG. 11(c), in a state where the two-dimensional video display device 70 is deviated inside from the mirror device 80 (inner side as seen from the observer) so that the lower edges 81a, 82a, and 83a of the mirrors are not matched with the boundary lines 93a, 93b, and 93c, as illustrated in FIG. 10, the virtual images of the apexes of the reference marks are displayed to be sunk into the lower edges 81a, 82a, and 83a of the mirrors so as to be out of sight.

It is very obvious that the states illustrated in FIGS. 9 and 10 are the state where the virtual images 62a', 62b', and 62c' of the apexes of the reference marks are in contact with the lower edges 81a, 82a, and 83a of the mirrors in the example of FIG. 8. In other words, by displaying the adjusting screen 6, the observer may display so as to be obviously understood whether the screen 71 of the two-dimensional video display device 70 is in a predetermined position with respect to the mirror device 80.

As illustrated in FIGS. 9 and 10, if the screen 71 is deviated and the positions of the two-dimensional video display device and the mirror device 80 are not physically adjusted, a desired three-dimensional video may be displayed by using the shift adjustment of the screen.

[Shift Adjustment]

Figure 11:
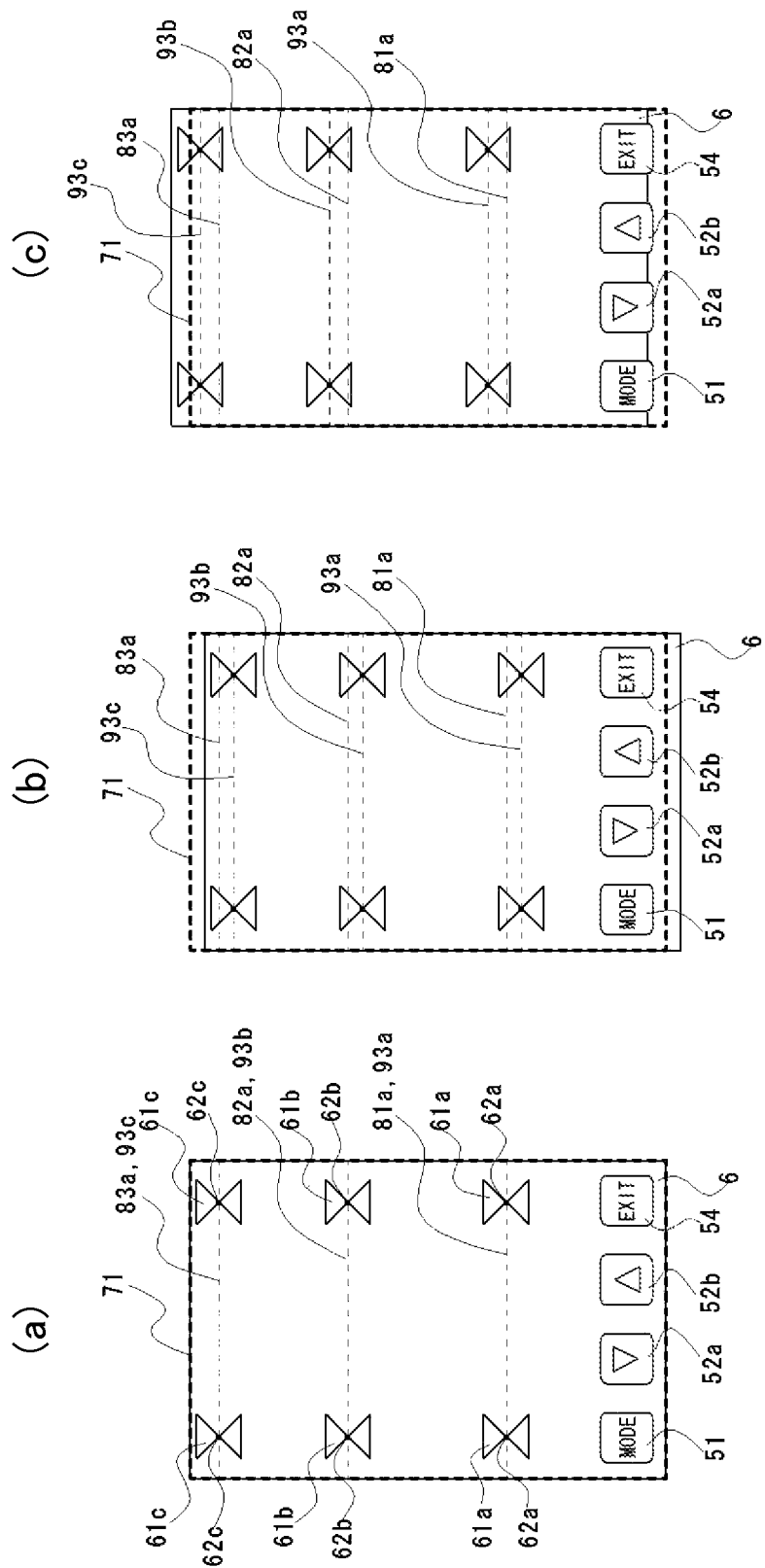
FIG. 11 A view illustrating an example of an adjusting screen for shifting a screen according to an embodiment.

Referring to FIG. 11, the shift adjustment function of the screen may be described.

In order to perform the shift adjustment of the image, the touch type shift button 52 is provided in the adjusting screen.

The shift button 52 includes the front shift button 52a and the back shift button 52b. Whenever the front shift button 52a is pressed once, the display of the adjusting screen moves front by a predetermined distance (one pixel). Whenever the back shift button 52b is pressed once, the display of the adjusting screen moves back by a predetermined distance.

Here, the shift button 52, as illustrated in FIGS. 1 and 11, may be disposed in a screen disposed close to the observer in the virtual image generating region 91a so as to be in contact with the finger of the observer even in a state where the mirror device 80 is mounted in the two-dimensional video display device.

If the button is disposed outside the virtual image generating region 91a, the button is pressed after separating the mirror device 80 from the screen 71 and the mirror device is mounted in the screen 71 to check a stereoscopic image so that it takes time to adjust the screen.

Further, the screen shift may be easily controlled by using a known screen movement control technology.

In the case of FIGS. 9 and 10, in a state where the mirror device 80 is mounted in the two-dimensional video display device, when the observer presses the front shift button 52a or the back shift button 52b a predetermined number of times while watching the three-dimensional video, the display of the screen moves by a predetermined amount in accordance with the manipulation. Therefore, finally, as illustrated in FIG. 8, the display of the screen may be adjusted to be set in a position of a normal reference mark.

As described above, since the observer may manipulate the shift adjustment of the screen while watching the three-dimensional video as illustrated in FIGS. 8 to 10, the observer may instinctively understand the adjustment manipulation. Further, in the state where the mirror device 80 is mounted, the shift button 52 is manipulated to adjust the deviation of the screen.

[Case where Screen Sizes are Different]

As illustrated in FIGS. 13(b) and (c), if sizes of the screen 71 and the adjusting screen 6 are different, as illustrated in FIG. 12, the virtual image of the apex of the reference mark is out of sight since the virtual image 62c' of the apex of the reference mark 61c is separated from the lower edge 83a of the mirror or the virtual image 62a' of the apex of the reference mark 61a is sunk below the lower edge 81a of the mirror. Therefore, if the sizes of the screen 71 and the adjusting screen 6 are different, the observer may instinctively understand that a desired three-dimensional video may not be obtained. In this case, the video is enlarged or reduced to be displayed so that a desired three-dimensional video may be obtained.

Figure 13:
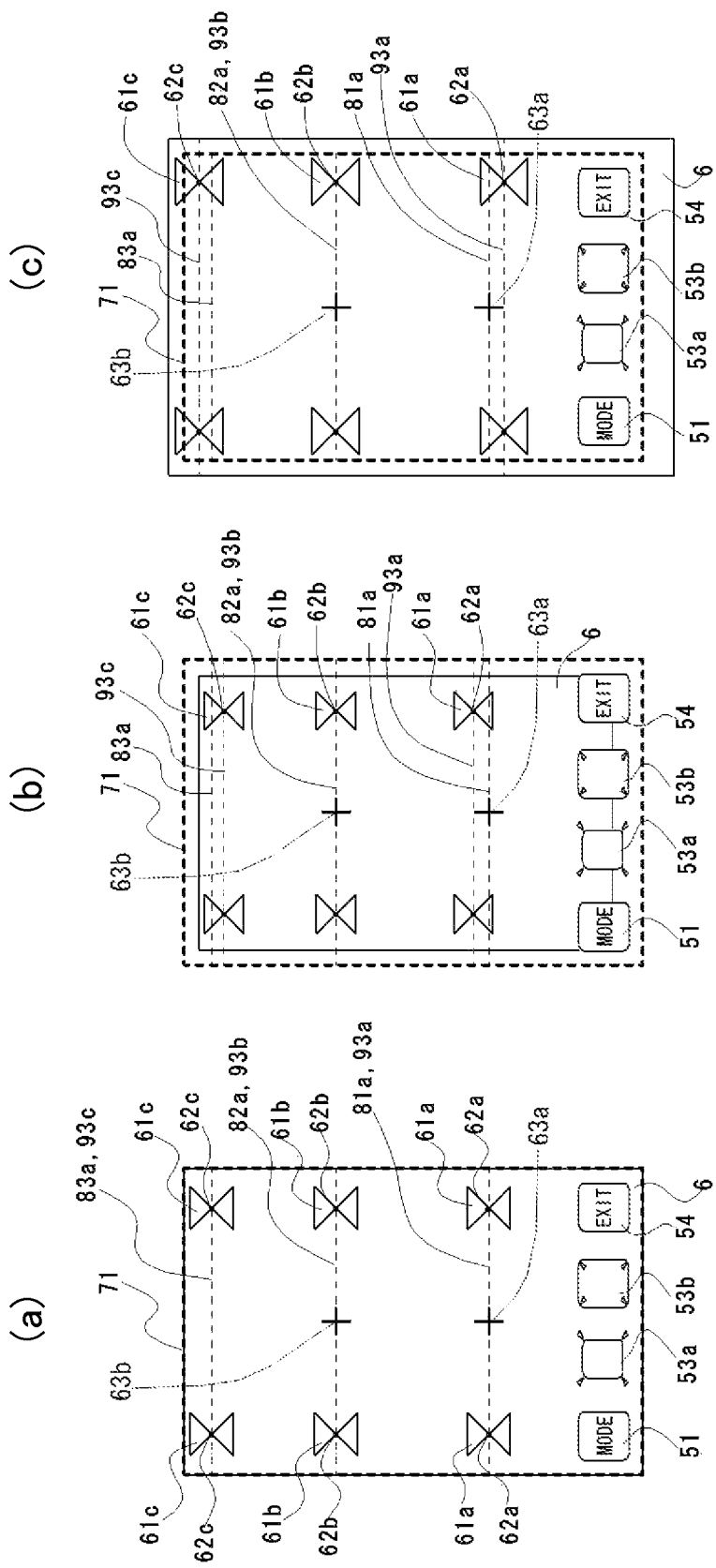
FIG. 13 A view illustrating an example of an adjusting screen for enlargement or reduction according to an embodiment.

In order to enlarge or reduce the video, as illustrated in FIG. 13, a touch type enlargement/reduction button 53, that is, the reduction button 53a and the enlargement button 53b are provided in the adjusting screen. Whenever the reduction button 53a is pressed once, the adjusting screen is reduced by a predetermined amount to be displayed. Further, whenever the enlargement button 53b is pressed once, the adjusting screen is enlarged by a predetermined amount to be displayed. In addition, the enlargement or reduction of the screen may be easily controlled by using a known screen enlargement or reduction control technology.

Here, for the same reason that the shift button 52 is provided, the enlargement/reduction button 53 may be disposed in a screen disposed close to the observer in the virtual image generating region 91a. The observer presses the reduction button 53a or the enlargement button 53b a predetermined number of times while watching the three-dimensional video, and finally allows the screen to approach the position of the normal reference mark as illustrated in FIG. 8. As illustrated in FIG. 12, since the observer may manipulate the adjusting screen while watching the adjusting screen of the three-dimensional video, it is possible to instinctively understand the adjustment manipulation.

[Functional Configuration of Two-Dimensional Video Display Device]

Figure 2:
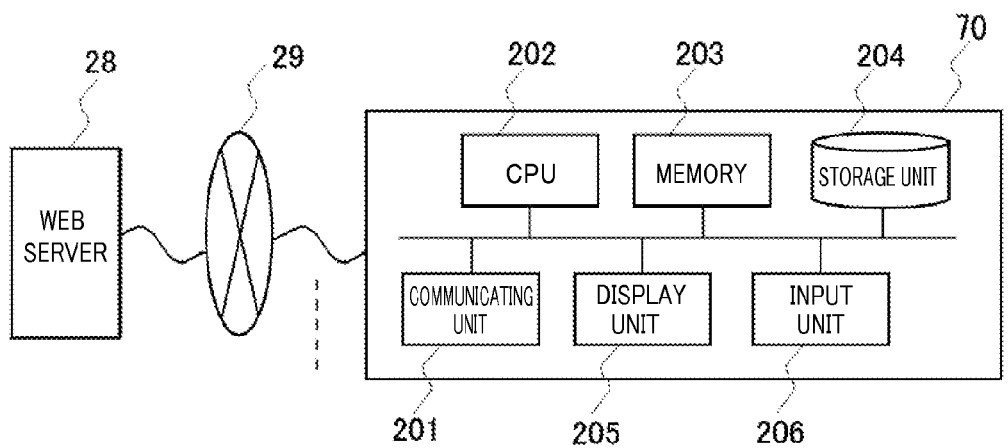
FIG. 2 A block diagram illustrating a functional configuration of a two-dimensional video display device according to an embodiment.

FIG. 2 is a block diagram illustrating a functional configuration of the two-dimensional video display device.

The two-dimensional video display device 70 is a portable terminal such as a smart phone and includes a communicating unit 201 that transmits/receives data to/from a service providing device such as a web server 28 through a communicating network 29, a processor (CPU) 202 that executes a program, a memory 203 such as a semiconductor memory that stores a program or data which is being processed, a large capacity storage unit 204 that stores content data such as a program or a video, a display unit 205 that displays a video or various information, and an input unit 206 that is manipulated by a user.

The processor 202 executes various application programs (hereinafter, simply referred to as programs). In the embodiment, at the time of displaying a three-dimensional video, a video display program that displays a two-dimensional video in a screen of the video display device in accordance with a specific format (three-dimensional video format) for a three-dimensional video is executed. The three-dimensional video format refers to a format that draws a video in a plurality of divided virtual image generating regions.

Further, a program that implements a display irregularity adjusting function of the screen which is a feature of the present embodiment (hereinafter, referred to as a screen adjusting program) is executed. The video display program or the screen adjusting program may be obtained by downloading the programs through the network 29 and the communicating unit 201 from the web server 28 of a provider that provides a three-dimensional video displaying service by manipulating the input unit 206 of the video display device by the observer. The obtained program is stored in the storage unit 204. The program is loaded in the memory 203 from the storage unit 204 and executed by the processor 202. In addition, the two-dimensional video (video contents) to be displayed by executing the video display program includes a movie, scenery, or a game. Similarly, the video contents are downloaded from the web server 28 to be obtained and then stored in the storage unit 204.

Figure 3:
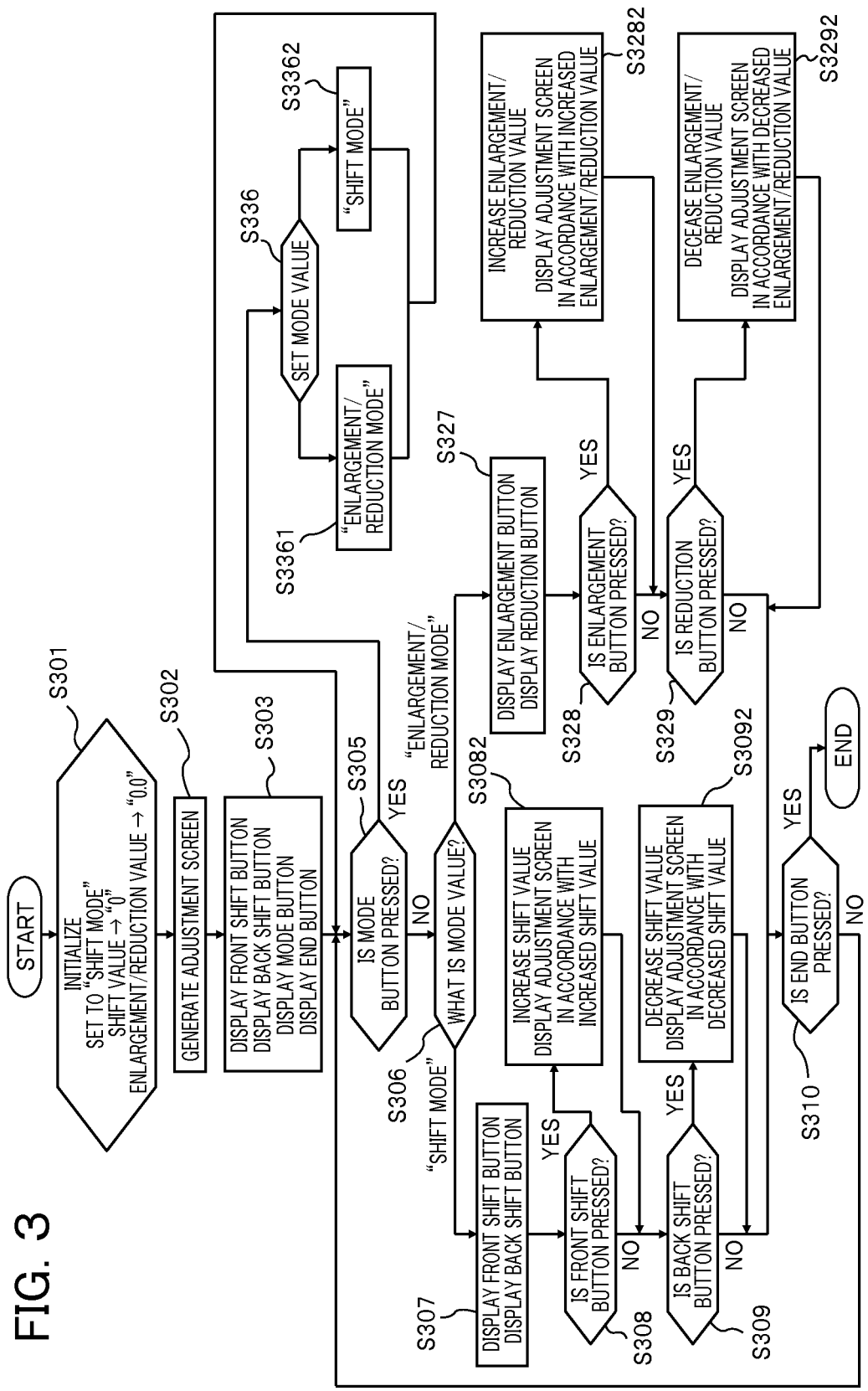
FIG. 3 A flow chart illustrating an executing operation of a screen adjusting program according to an embodiment.
Figure 4:
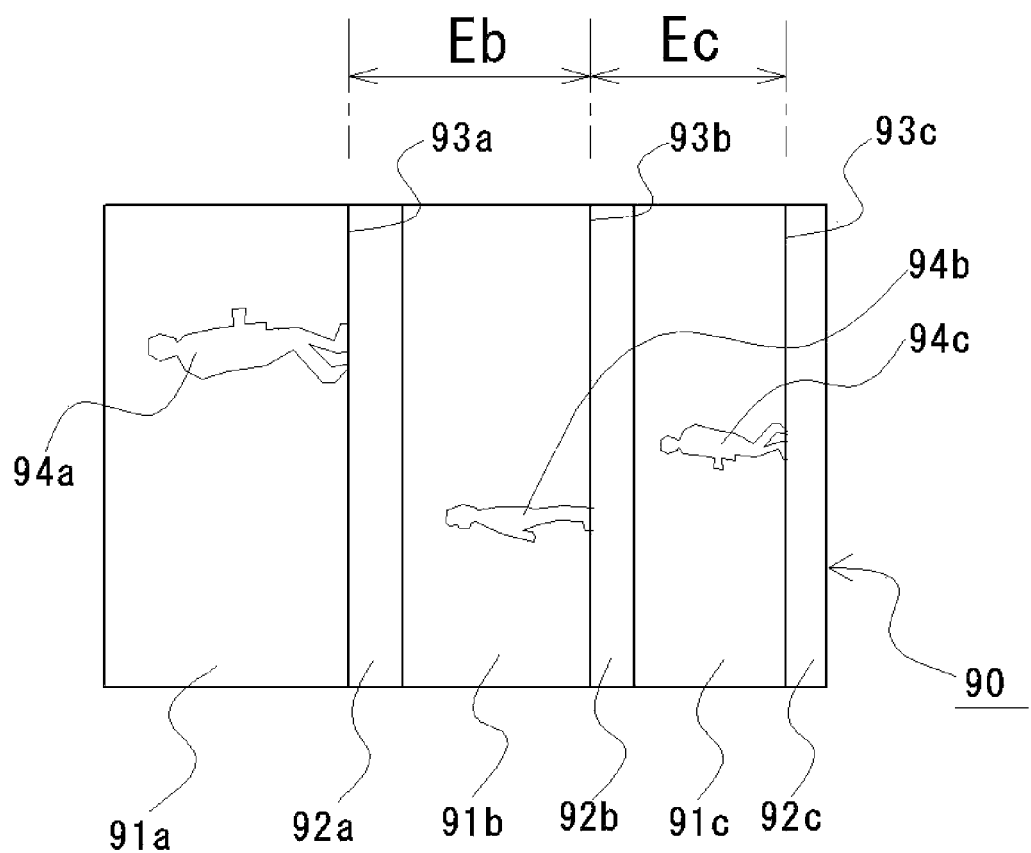
FIG. 4 A view illustrating a three-dimensional video format in a three-dimensional video display device.

The processing operation by the screen adjusting program will be described below with reference to FIG. 3. However, the screen adjusting program may be controlled such that the video display program is started by the processor 202 and the screen adjusting program is executed before displaying a video having an observer-desired three-dimensional video format to adjust the screen deviation.

Further, as another example, while a video having a three-dimensional video format is displayed by executing the video display program by the processor 202, if an observer detects the display irregularity of the screen to adjust the screen, the observer manipulates a specific button to start and execute the screen adjusting program. In this case, the video displaying may be temporally stopped.

In the two-dimensional video display device such as a smart phone, the input unit 206 includes a plurality of touch type display buttons and every display button may have various input functions. In the embodiment, as an input function of the display button, a shift button which may move the screen forward or backward or an enlargement/reduction button that changes the size of the screen to be enlarged or reduced are set. Further, if the two-dimensional video display device is a portable terminal having a display screen and an input unit 206 including a plurality of mechanical keys rather than the smart phone, the above-mentioned function keys may be implemented by the mechanical keys.

Further, the screen adjusting program is not a separate program from the image display program but may be incorporated as one of the functions of the video display program. In this case, whenever the video display program is executed, the function of the screen adjusting program may be performed at first or a predetermined time.

[Display Irregularity Adjusting Control Operation of Screen]

Next, referring to the flow chart of FIG. 3, the screen adjustment control operation of a screen deviation will be described.

The control operation is performed by executing the screen adjusting program stored in the storage unit 204 or the memory 203 by the processor 202. By executing the screen adjusting program, as a screen change control mode, a shift mode that moves the screen forward or backward and an enlargement/reduction mode that change a size of the screen to be enlarged or reduced the screen may be selectively set. Further, the adjusting screen which is changed by the screen adjusting program is initially stored in the storage unit 204 or the memory 203.

If the screen adjusting program starts, first, in an initializing operation, a control mode is set to a shift mode and a shift value is set to "0" and an enlargement/reduction value is set to "0.0" (S301). The adjusting screen stored in the storage unit 204 or the memory 203 is read out and the initial values is set in the adjusting screen to generate an adjusting screen 6 (adjusting screen as illustrated in FIG. 11(a)) (S302). The generated adjusting screen includes the front shift button 52a, the back shift button 52b, the mode button 51, and the end button 54. The adjusting screen is displayed in the screen 71 with a currently set shift value and enlargement/reduction value (S303). Here, in the initializing operation, the reason why the adjusting screen is first set to the shift mode is that if the forward or backward movement of the screen is adjusted first and the enlargement/reduction adjustment is performed thereafter, the observer can easily perform the adjusting operation.

In this state, if the observer presses the mode button (S305), the mode value is determined (S336). If the current mode value is the enlargement/reduction mode, the mode is changed from the shift mode to the enlargement/reduction mode to be set (S3361). If the current mode value is the shift mode, the mode is changed from the shift mode to the enlargement/reduction mode to be set (S3362), which is an operation that switches a current mode into another mode.

When the mode button is determined (S305), if the mode button is not pressed, it is determined what is the current mode value (S306). As a result of the determination, if the current mode value corresponds to the shift mode, the processing S307 to S309 is performed. In contrast, if the current mode value corresponds to the enlargement/reduction mode, the processing S327 to S329 is performed.

In the case of the shift mode, the front shift button 52a and the back shift button 52b are displayed on the adjusting screen (S307). Thereafter, whenever the front shift button 52a is pressed (S308), the shift value is increased (plus) by a predetermined amount and the adjusting screen which is shifted to the front side (in a direction approaching the observer) in accordance with the shift value is generated to be displayed on the screen 71 (S3082). In contrast, whenever the back shift button 52b is pressed (S309), the shift value is decreased (minus) by a predetermined amount and the adjusting screen which is shifted to the back side in accordance with the shift value is generated to be displayed on the screen 71 (S3092).

Thereafter, if the end button 54 is pressed (S310), the operation of executing the screen adjustment program is completed. In contrast, if the end button 54 is not pressed, the sequence returns to S305. By the screen adjustment operation, the screen on which the video is displayed is adjusted in a forward or backward direction in order to display a three-dimensional video (that is, the display irregularity of the screen is resolved).

In the shift mode, if neither the front shift button nor the back shift button is manipulated ("No" in S308 and S309), the displayed screen is already adjusted in the forward or backward direction (that is, no necessary to adjust in the forward or backward direction). In this case, if the observer presses the end button 54, the screen adjustment operation is completed.

If the mode button is pressed and the mode is switched to the enlargement/reduction mode (S306), processing S327 to S329 is performed. That is, as illustrated in FIG. 13(b), whenever the enlargement button 53b is pressed (S328), the enlargement/reduction value is increased by a predetermined amount and the adjusting screen 6 is generated in accordance with the increased enlargement/reduction value to be displayed on the screen 71 (S3282). In contrast, as illustrated in FIG. 13(c), whenever the reduction button is pressed (S329), the enlargement/reduction value is decreased by a predetermined amount and the adjusting screen 6 is generated in accordance with the decreased enlargement/reduction value to be displayed on the screen 71 (S3292). Thereafter, if the end button 54 is pressed, the operation of executing the screen adjustment program is completed (S310). If the end button is not pressed, the sequence returns to S305 to repeat the above operations.

Here, the shift value and the enlargement/reduction value which are changed by the screen adjustment program are stored in the memory 203 or the storage unit 204 even after completing the execution of the program. When the video for displaying the three-dimensional video is displayed on the screen 71 of the display unit 205, using the stored shift value and enlargement/reduction value, the video is controlled to be shifted in the forward or backward direction and if necessary, the video is controlled to be enlarged or reduced to be displayed on the screen 71.

As described above, it is possible to accurately and simply adjust the deviation or the size of the screen in order to display the three-dimensional video, to display the two-dimensional video on the screen 71 in a state where the display irregularity is resolved, and to display the three-dimensional video through the mirror device.

Even though the embodiments of the present invention have been described above, the invention is not limited to the above-described embodiments, but may be modified and embodied in various modified forms.

In the above embodiments, when the shift adjustment function and the enlargement/reduction adjustment function are provided in order to adjust the screen with display irregularity, the function modes are switched by manipulating the mode button 51. However, the mode buttons 51 may be provided in accordance with each of the function modes.

Further, in the above embodiment, two buttons, that is, the front shift button and the back shift button are provided as the shift button 52 and two buttons, that is, the enlargement button and the reduction button are provided as the enlargement/reduction button 53. However, according to an alternative example, without providing two buttons for the individual function buttons, one button having a flick function and one button having a zooming function that adopts a multi-finger touch method may be provided as the shift button and the enlargement/reduction button, respectively.

Further, according to another alternative example, the front shift button 52a, the back shift button 52b, the enlargement button 53a, and the reduction button 53b may be simultaneously displayed. In this case, the mode button 51 does not need to be displayed.

Further, even though not directly related to adjustment of a screen with display irregularity which is the gist of the present invention, the mirror device is not limited to the mirror device illustrated in FIGS. 14 and 15 but may be designed in various modified forms in accordance with the size and the shape of the video display device. In addition, the mirror device may include a mechanism that folds the plurality of mirrors 81 to 83 in the mirror case.

Further, in the above-described embodiments, it is described that both the shifting function and the enlarging/reducing function may be provided in order to adjust the screen with display irregularity. However, one of them, for example, only the shift adjustment function may be provided.

DESCRIPTION OF REFERENCE NUMERALS 6 adjusting screen
70 two-dimensional video display device
71 screen
80 mirror device
81, 82, 83 mirror
90 three-dimensional video format
91 image generating region
92 virtual image non-generating region
93 boundary line
94 video
201 communicating unit
202 processor
203 memory
204 storage unit
205 display unit
206 input unit

The invention claimed is:

1. A three-dimensional video display device that includes a mirror device in which a plurality of mirrors are disposed to be parallel to each other and reflects a video displayed on a display screen of the video display device from the plurality of mirrors to display the video as a three-dimensional video, the video display device comprising:

a storage unit that stores a program and a video;

a processor that executes the program;

a display unit having a display screen that has a predetermined format having a plurality of regions corresponding to the plurality of mirrors in order to display the three-dimensional video; and an input unit that is manipulated by a user;

wherein the input unit includes a shift input unit that instructs to move the display screen with the format to be displayed on the display screen in a forward or backward direction of the display screen as seen from the user, the processor executes the program to function as:

a unit that generates an adjusting screen with the predetermined format including display of a specific indication mark which is used to check display irregularity of the display screen in a relationship between the mirror and the corresponding region of the adjusting screen with the format;

a screen shift control unit that controls the adjusting screen including the indication mark to be moved forward or backward by a predetermined amount to be displayed on the display screen in accordance with an instruction from the shift input unit; and a unit that disposes a video for displaying the three-dimensional video in the plurality of regions so as to generate a display screen with the format in a state where the adjusting screen is moved by a predetermined amount by the control of the screen shift control unit, and the video of the adjusting screen with the format generated by the generating unit is displayed on the display screen of the video display device and the displayed video is reflected from the plurality of mirrors to be displayed as a three-dimensional video.

2. The three-dimensional video display device according to claim 1, wherein the input unit includes an enlargement/reduction input unit that instructs the adjusting screen with the format which is displayed on the display screen to be enlarged or reduced, and the processor executes the program to function as:

a unit that generates an adjusting screen with the format including display of a specific indication mark which is used for correction to enlarge or reduce the adjusting screen in a relationship between the mirror and the region of the adjusting screen with the format;

a screen enlargement/reduction control unit that controls the adjusting screen including the indication mark to be enlarged or reduced by a predetermined amount to be displayed on the display screen in accordance with an instruction from the enlargement/reduction input unit; and a unit that disposes a video for displaying the three-dimensional video in the plurality of regions so as to generate an adjusting screen having the format in a state where the adjusting screen is enlarged or reduced by a predetermined amount by the control of the adjusting screen enlargement/reduction control unit, and the video of the adjusting screen with the format generated by the generating unit is displayed on the display screen of the video display device and the displayed video is reflected from the plurality of mirrors to be displayed as a three-dimensional video.

3. The three-dimensional video display device according to claim 2, wherein the input unit is a touch type input unit, and the processor generates a display in which an input button that configures the shift input unit or the enlargement/reduction input unit is disposed in the adjusting screen.

4. The three-dimensional video display device according to claim 3, wherein the processor generates a display in which a mode selecting button that selects a shift mode by the screen shift control unit and an enlargement/reduction mode by the screen enlargement/reduction control unit is disposed in the adjusting screen.

5. The three-dimensional video display device according to claim 4, wherein the processor generates the adjusting screen in which the shift input button, the enlargement/reduction input button, and the mode selecting button are disposed in a region which is the closest to the user among the plurality of regions that configures the adjusting screen with the format.

6. The three-dimensional video display device according claim 1, wherein a border of the plurality of regions that configure the adjusting screen with the format is set based on positions of the plurality of mirrors corresponding to the display screen, and the indication mark is formed to be a line symmetric or asymmetric to a line that defines the border.

7. A control method of a three-dimensional video display that disposes a mirror device in which a plurality of mirrors are disposed to be parallel to each other in a video display device which includes a display unit having a display screen that has a predetermined format having a plurality of regions corresponding to the plurality of mirrors in order to display a three-dimensional video and an input unit that is manipulated by a user, and reflects a video displayed on a display screen of the video display device from the plurality of mirrors to display the video as a three-dimensional video, the method comprising:

a step for generating an adjusting screen with the format including display of a specific indication mark which is used to check display irregularity of the display screen in a relationship between the mirror and the region of the adjusting screen with the format;

a shift input step for instructing the adjusting screen with the format which is displayed on the display screen to be moved in a forward or backward direction of the display screen as seen from the user by the manipulation of the input unit;

a screen shift control step for controlling the adjusting screen including the indication mark to be moved forward or backward by a predetermined amount to be displayed on the display screen in accordance with an instruction from the shift input step;

a step for generating the adjusting screen with the format in a state where the adjusting screen is moved by a predetermined amount by the screen shift control step by disposing a video for displaying the three-dimensional video in the plurality of regions; and a step for displaying the video of the adjusting screen with the format generated by the generating step on the display screen of the video display device and reflecting the displayed video from the plurality of mirrors to be displayed as a three-dimensional video.

8. The three-dimensional video display control method according to claim 7,
wherein the input unit is a touch type input unit, and
a display in which the input button used in the shift input step is disposed in the adjusting screen is generated.

9. The three-dimensional video display control method according to claim 8, wherein the adjusting screen is generated in which the shift input button, an enlargement/reduction input button, and a mode selecting button are disposed in a region which is the closest to the user among the plurality of regions that configure the screen with the format.

10. The three-dimensional video display control method according to claim 7, comprising:
a step for instructing by the input unit the adjusting screen with the format which is displayed on the display screen to be enlarged or reduced,
a step for generating an adjusting screen with the format including display of a specific indication mark which is used for correction to enlarge or reduce the adjusting screen in a relationship between the mirror and the region of the adjusting screen with the format;
a step for controlling the adjusting screen including the indication mark to be enlarged or reduced by a predetermined amount to be displayed on the display screen in accordance with an instruction from the input unit; and
a step for disposing a video for displaying the three-dimensional video in the plurality of regions so as to generate an adjusting screen having the format in a state where the adjusting screen is enlarged or reduced by a predetermined amount, and
a step for displaying the video of the adjusting screen with the format generated on the display screen of the video display device and the displayed video is reflected from the plurality of mirrors to be displayed as a three-dimensional video.

11. The three-dimensional video display control method according to claim 10,
wherein the input unit is a touch type input unit, and the method further comprises:
generating display in which a mode selecting button that selects a shift mode by the screen shift control step and an enlargement/reduction mode by a screen enlargement/reduction control step is disposed in the adjusting screen.

12. The three-dimensional video display control method according to claim 7,
wherein a border of the plurality of regions that configure the screen with the format is set based on positions of the plurality of mirrors corresponding to the display screen, and
the indication mark is formed to be a line symmetric or asymmetric to a line that defines the border.

13. A non-transitory computer readable medium storing a screen adjusting program that is executed by a processor in a three-dimensional video display device that disposes a mirror device in which a plurality of mirrors are disposed to be parallel to each other in a video display device which includes a storage unit that stores a program and a video, a processor that executes the program, a display unit having a display screen that has a predetermined format having a plurality of regions corresponding to the plurality of mirrors in order to display a three-dimensional video and an input unit that is manipulated by a user, and reflects a video displayed on a display screen of the video display device from the plurality of mirrors to display the video as a three-dimensional video, the program executes operations comprising:
a step for generating an adjusting screen with the format including display of a specific indication mark which is used to check display irregularity of the display screen in a relationship between the mirror and the region of the adjusting screen with the format;
a shift input step for instructing the adjusting screen with the format which is displayed on the display screen to be moved in a forward or backward direction of the display screen as seen from the user by the manipulation of the input unit;
a screen shift control step for controlling the adjusting screen including the indication mark to be moved forward or backward by a predetermined amount to be displayed on the display screen in accordance with an instruction from the shift input step; and
a step for generating the adjusting screen with the format in a state where the adjusting screen is moved by a predetermined amount by the screen shift control step by disposing a video for displaying the three-dimensional video in the plurality of regions.

* * * * *